United States Patent

Stephens

[15] 3,679,031

[45] July 25, 1972

[54] REVERSIBLE ONE-WAY CLUTCH

Leonard W. Stephens, Fairview, Pa. 16415

[73] Assignee: Palmer Filter Equipment Company, Fairview, Pa.

[22] Filed: Oct. 5, 1970

[21] Appl. No.: 78,114

[52] U.S. Cl. ............................. 192/44, 81/59.1, 81/63.1
[51] Int. Cl. ............................................. F16d 41/08
[58] Field of Search ............... 192/44, 72; 81/59.1, 63.1

[56] References Cited

UNITED STATES PATENTS

| | | | |
|---|---|---|---|
| 2,707,540 | 5/1955 | Morris | 192/44 X |
| 3,019,872 | 2/1962 | Morris et al. | 192/44 |
| 1,859,600 | 5/1932 | Prettyman | 192/44 X |
| 2,003,155 | 5/1935 | Pfauser | 192/44 |
| 2,153,988 | 4/1939 | Padgett | 81/59.1 |

*Primary Examiner*—Allan D. Herrmann
*Attorney*—Charles L. Lovercheck

[57] ABSTRACT

A reversible one-way clutch suitable to be used in combination with a drive and a driven member. The clutch is made up of a drum and a plurality of frictional shoes which connect the drive to the driven member. The shoes are actuated by cams. The cams move the shoes out into engagement with the drum connecting a driven member to the drive. A reversing mechanism is provided for holding the shoes away from the cam when a torsional force is exerted on the drive in a first direction relative to the driven member but allowing the shoes to move toward the cam and transmit force when a torsional force is exerted in an opposite direction between said drive and driven member. The reversing mechanism makes it possible to selectively drive the clutch either in a first direction or in a second direction.

5 Claims, 10 Drawing Figures

Patented July 25, 1972
3,679,031
3 Sheets-Sheet 1
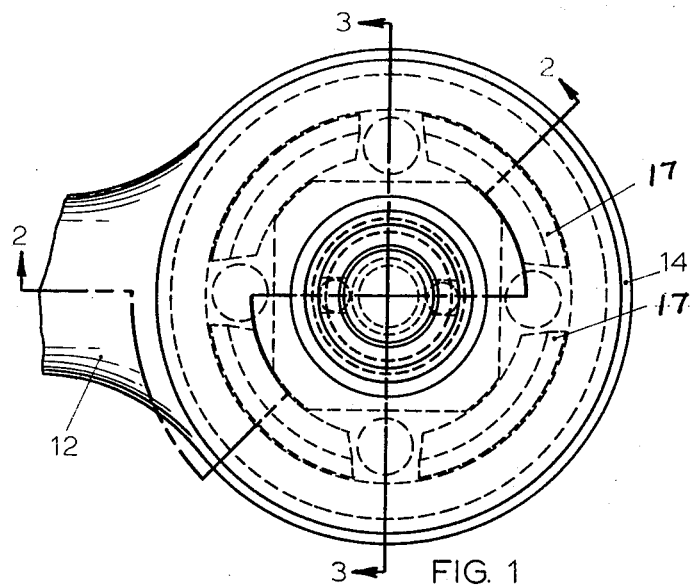
FIG. 1
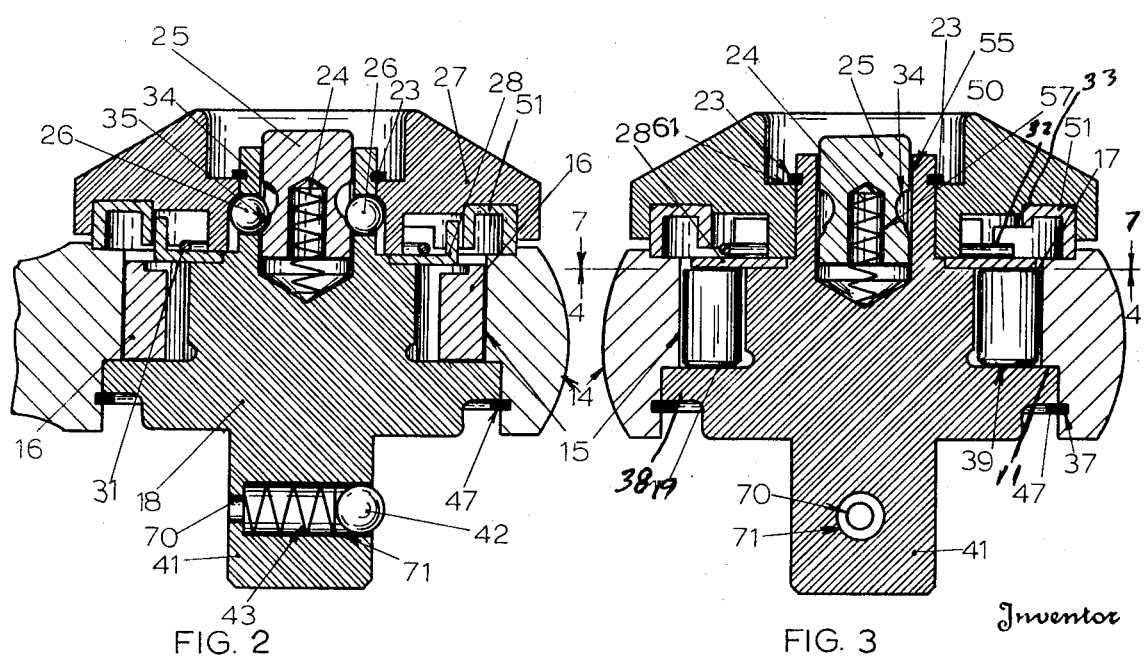
FIG. 2
FIG. 3
Inventor
LEONARD W. STEPHENS
By
Charles L. Lovercheck
Attorney

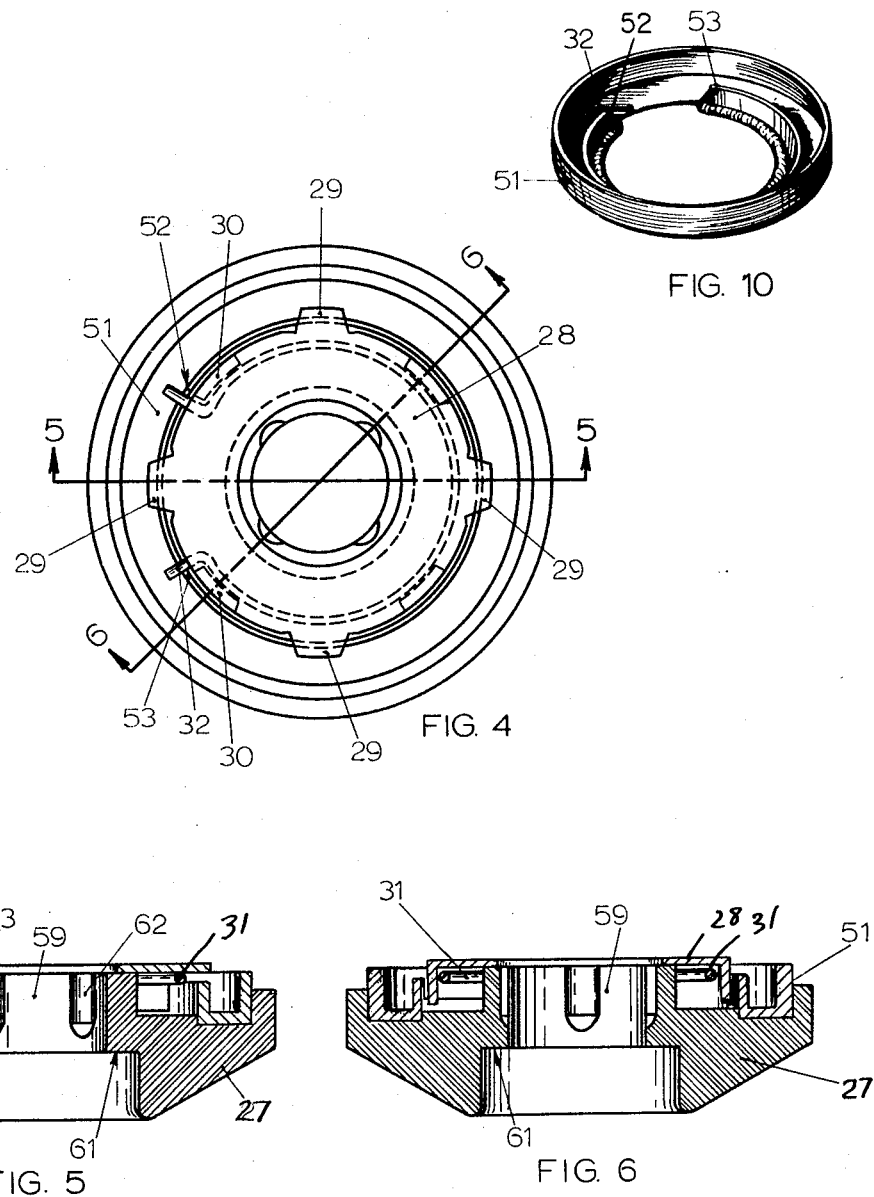

Inventor
LEONARD W. STEPHENS

REVERSIBLE ONE-WAY CLUTCH

STATEMENT OF INVENTION

This invention relates to clutches and, more particularly, to a specific type of clutches for wrenches.

OBJECTS OF THE INVENTION

It is an object of the invention to provide an improved clutch.

Another object of the invention is to provide an improved wrench handle.

Another object is to provide a one-way clutch that is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

REFERENCE TO PRIOR ART

This invention is an improvement over U.S. Pats. Nos. 2,707,540 and 3,019,872 to Harry C. Morris.

DESCRIPTION OF THE DRAWINGS

FIG. 1 is a top view of a preferred embodiment of the invention, showing the clutch used in a wrench.

FIG. 2 is a cross sectional view taken on line 2—2 of FIG. 1.

FIG. 3 is a cross sectional view taken on line 3—3 of FIG. 1.

FIG. 4 is a top view of FIG. 5.

FIG. 5 is a partial cross sectional view taken on line 5—5 of FIG. 4.

FIG. 6 is partial cross sectional view taken on line 6—6 of FIG. 4.

FIG. 10 is an enlarged view of the press-in washer and spring ring.

DETAILED DESCRIPTION OF THE DRAWINGS

Figure 7:
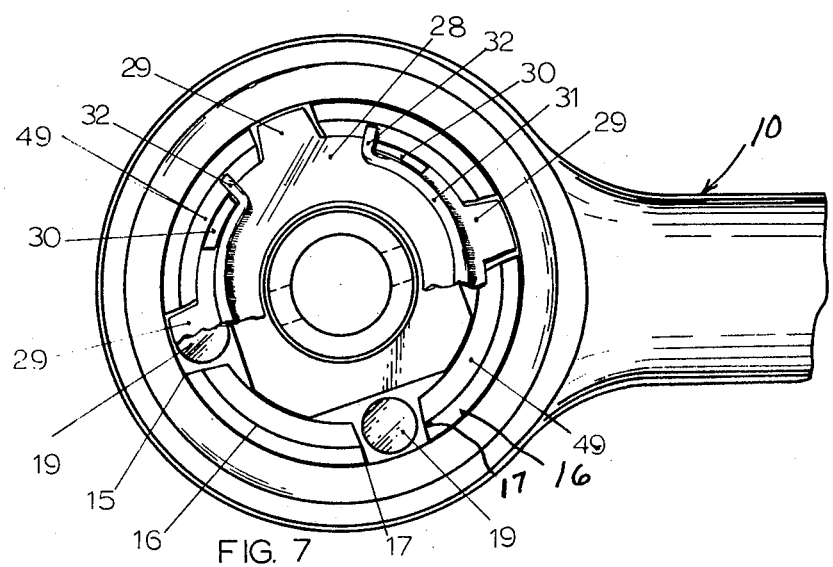
FIG. 7 is a cross sectional view taken on line 7—7 of FIG. 3.
Figure 8:
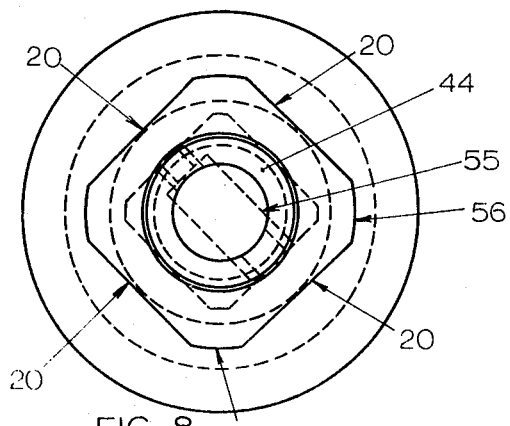
FIG. 8 is a bottom view of the shank shown in FIG. 9.
Figure 9:
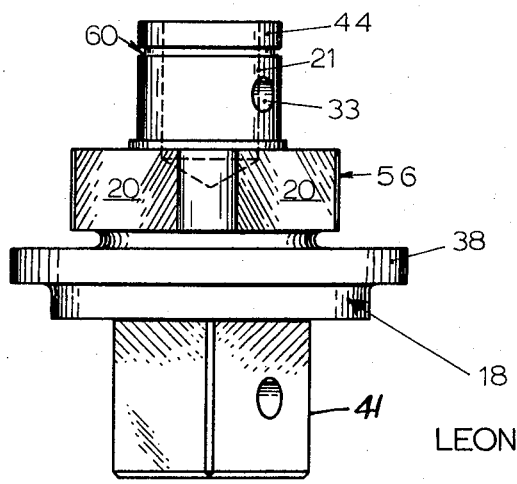
FIG. 9 is a side view of the shank as shown in FIG. 8.

The clutch according to the invention is shown in a preferred embodiment in use in a ratchet type wrench for use by mechanics. The wrench is indicated generally at 10, having a drive means by way of a handle, and is made up of the major components, which include the shank 18, cap 27, star wheel 28, shoes 16, cam roller members 19, and spring 31. The wrench body 14 which has an internal cylindrical surface 15 which frictionally engage the outer cylindrical surface of shoes 16. The body 14 has an internal peripheral groove 37, which receives a spring washer 40. The spring washer 40 engages the rim 38 on the shank and holds the shank 18 in place in the body. The shank rests against the shoulders 11 in the body and freely rotates between the shoulders 11.

The shank 18 has the male socket wrench receiving member 41, which may be inserted into a suitable socket wrench of a type familiar to those skilled in the art, and a detent ball 42 in hole 71 in the male member urged outward by spring 43 will hold the socket in place.

The shank 18 has a round stem 21 that is in the form of a cylinder integrally attached to the cam portion 56 of shank 18. The cam portion 56 is generally square and has the flat cam surfaces 20 on each of its four sides, and these cam surfaces 20 engage the ends 17 of shoes 16 and urge the shoes outward into engagement with surface 15.

The wrench is assembled by placing the shank 18 into the drum 14 with the rim 38 resting in the counterbore as shown in FIGS. 3 and 4. The snap washer 47 is then snapped into the groove 37 so that the shank can freely rotate between the counterbore and the washer. The shoes 16 are then placed inside the cylindrical surface 15 resting on surface 39 and the cams are placed between the inclined ends 17 of the shoes. The star wheel 28 is then laid over top of the shoes 16 and the cam roller members 19 in the position shown in the upper end of FIG. 7 with the points 29 of the star wheel disposed between the ends 17 of the shoes and overlying the cam roller members 19. It will be noted that the shoes have an arcuate offset 49 cut in them which receive the outer curved periphery of the star wheel. The star wheel has the upwardly extending lugs 30, which receive the spring 31 and locate it in position. It will be noted that spring 31 is in the form of a circle with the outwardly extending ends 32. The outwardly extending ends 32 overlie the outer ends of the lugs 30 and are received in groove 52 in flange 53 of washer 51. The spring washer 23 is disposed in a groove 60 in shank 18. This washer 23 holds the cap 27 in place. The cap 27 has a groove cut in the underside of it which receives pressed-in washer 51 and the ends 32 of the spring are received in the groove 52 in upturned flange 53 of washer 51.

The groove 33 limits the movement of the ends 32 of the spring 31 and forces the spring to rotate together with the cap when the cap is rotated. Thus, the star wheel 28 is forced to rotate with the cap by the ends 32 of the spring which engage the lugs 30.

The button 25 is received in a central bore 55 in the end 44 of the shank 18. The corners adjacent the cams 20 are rounded off at 56 on the radius slightly less than the inside diameter of the shoes 17, so that the shank may rotate freely inside the shoes. A spring 24 is supported inside the bore 57 in the button 25, and this spring urges the button outward.

The stem 21 has a radial hole 33 in it, in which the locking balls 26 are received. These locking balls 26 may move into the large recess 34 when the button is in the depressed position, that is, pushed downward, and when the button 25 is moved upward, the locking balls 26 are received in the shallow recess 35.

The hole 59 in the cap 27 receives the stem 21, and the stem 21 has a peripheral groove 60 which receives the spring washer 23 which rests against the shoulder 61 in the cap and holds the cap on the shank. The locking balls 26 may move into either of the two circumferentially spaced grooves 62 or 63, depending on the position the cap 27 is rotated relative to the shank. Thus, when the cap is rotated so that a ball 26 is lined up with one of the grooves 62 or 63, the ball may move outward and allow the button 25 to jump up urged by the spring 24 so that the ball rests in the shallow groove 35, as shown in FIG. 2. Thus, the cap 27 will be restrained to rotate with the shank 18, and the spring 31 will be forced to rotate with the shank since its ends are received in the groove 51. Since the points 29 of the star wheel engage the ends of the shoe, the shoes will be moved by the shank and slide around inside the drum freely as the handle is rotated in this particular direction.

When the cap is rotated so that the ball 26 moves into the groove 63, the ends of the spring will engage the opposite end of the slot 52 in the washer 51, when the handle is rotated in the other direction relative to the shank. When the handle is rotated opposite to the direction that the end 32 engaged the end defining groove 52 of the washer 51, the cam surface 20 will force cam roller members 19 outward so that they drive the shoes 16 into engagement with the surfaces 15.

The drive washer 64 is pressed into the cap 27 and forms a convenient bearing therein for spring 31.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A clutch comprising,
   a body member having a cylindrical surface,
   drive means connected to said body member, shoes adapted to frictionally engage said cylindrical surface,
said shoes each comprising a part of a cylinder having an outside surface of substantially the same curvature as said body member,
cam means engaging the ends of said shoes,
and cam roller members engaging said cam means,
said cam roller members being supported on a shank,
a reversing means,
said reversing means comprising a member for holding said cam means from forcing said shoes into engagement with said body member when said drive means is rotated in a first direction and allowing said cam means to force said shoes into engagement with said body member when said drive means is rotated in a second direction,
said reversing means comprising a member for reversing the action of said drive means relative to said shoes and said body member,
actuating means comprising a star wheel having points overlying said cam roller members and engaging the ends of said shoes and upwardly extending lugs engaging an actuating member on said clutch.

2. The clutch recited in claim 1 wherein said actuating means comprises a cap having a groove therein receiving at least one said lug member,
said reversing means comprises means for positioning said cap relative to said shank whereby said shoes are allowed to frictionally engage said body member when said drive member is rotated in the first direction,
and said shoes are held from engagement with said body member when said cap is rotated in a second direction.

3. The clutch recited in claim 2 wherein said reversing means further comprises a plurality of said lugs on said star wheel,
a washer having an upturned flange and a groove in said flange,
a spring formed into a ring and disposed within said lugs, the ends of said spring being turned outwardly,
said outwardly extending ends being received in said groove in said flange,
means to position said cap in a first position where a first end of said spring engages a first end of said groove and a second end of said spring engages a first said lug for reversing,
and to position said cap for reversing when said first end of said spring engages a second end of said groove and said second end of said spring engages a first said lug for forward drive.

4. The clutch recited in claim 3 wherein said means to position said cap comprises a round stem on said shank,
a central bore in said round stem,
a radial hole in said round stem,
a positioning button in said central bore,
a shall recess and a deep recess in said button,
a spring engaging said button, urging said button outwardly,
said cap having a first central bore receiving said round stem,
two circumferentially spaced grooves in said cap on the surface defining said central bore,
a positioning ball in said radial hold,
said ball being adapted to move out of said grooves in said cap and into said deep recess in said button when said button is in a first position,
said ball being adapted to move into one or the other of said grooves in said cap and into said shallow recess in said button when said cap is in a second position,
said cap being in position to engage said first end of said spring when said cap is in said first position and to engage said second end of said spring when said cap is in said second position.

5. The clutch recited in claim 3 wherein said means to position said cap comprises a round stem on said shank,
a central bore in said round stem,
a radial hole in said round stem,
a positioning button in said central bore,
a shallow recess and a deep recess in said button,
a spring engaging said button, urging said button outwardly,
said cap having a first central bore receiving said round stem,
four circumferentially spaced grooves in said cap on the surface defining said central bore,
two balls in said radial hole,
said balls being adapted to move out of said grooves in said cap and into said deep recess in said button when said button is in a first position,
said balls being adapted to move into two of the said grooves in said cap and into said shallow recess in said button when said cap is in a second position thus affecting a balance condition of said cap,
said cap being in position to engage said first end of said spring when said cap is in said first position and to engage said second end of said spring when said cap is in said second position.

* * * * *